United States Patent
Okumura

(10) Patent No.: US 9,334,922 B2
(45) Date of Patent: May 10, 2016

(54) FLUID-FILLED VIBRATION DAMPING DEVICE

(71) Applicant: SUMITOMO RIKO COMPANY LIMITED, Komaki-shi, Aichi (JP)

(72) Inventor: Kei Okumura, Kakamigahara (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 0 days.

(21) Appl. No.: 14/541,804

(22) Filed: Nov. 14, 2014

(65) Prior Publication Data

US 2015/0069686 A1   Mar. 12, 2015

Related U.S. Application Data

(63) Continuation of application No. PCT/JP2013/004187, filed on Jul. 5, 2013.

(30) Foreign Application Priority Data

Jul. 19, 2012   (JP) ................................. 2012-160619

(51) Int. Cl.
   *F16F 13/10*   (2006.01)
   *F16F 13/08*   (2006.01)

(52) U.S. Cl.
   CPC .................. *F16F 13/10* (2013.01); *F16F 13/08* (2013.01); *F16F 13/106* (2013.01)

(58) Field of Classification Search
   CPC ..... F16F 13/102; F16F 13/106; F16F 13/107; F16F 13/10
   See application file for complete search history.

(56) References Cited

U.S. PATENT DOCUMENTS 6,672,574 B2   1/2004  Hamada et al.
8,490,954 B2 *  7/2013  Saito ..................... F16F 13/106
                                                           267/140.13

(Continued)

FOREIGN PATENT DOCUMENTS

JP       A-9-42372      2/1997
JP       A-2009-41615   2/2009

(Continued)

OTHER PUBLICATIONS

International Search Report issued in International Patent Application No. PCT/JP2013/004187 dated Aug. 20, 2013 (with translation).

(Continued)

*Primary Examiner* — Bradley King
(74) *Attorney, Agent, or Firm* — Oliff PLC

(57) ABSTRACT

A fluid-filled vibration damping device including: a pressure-receiving chamber; an equilibrium chamber; a partition member having a communication aperture through which the two chambers communicate; and an elastic rubber plate superposed to cover the communication aperture from a pressure-receiving chamber side. The elastic rubber plate includes one or more contact retaining portions that are provided on an outer peripheral edge thereof and retained in contact against the partition member, and a deformation-allowing region that is provided between circumferentially opposite ends of one or two of the contact retaining portions of the elastic rubber plate and that is elastically deformable based on pressure differential between the two chambers. A gap is formed between the deformation-allowing region and the partition member so that a communication passage is constituted by including the gap through which the two chambers communicate with each other.

7 Claims, 10 Drawing Sheets

(56) References Cited

U.S. PATENT DOCUMENTS

| | | |
|---|---|---|
| 8,556,239 B2 | 10/2013 | Okumura et al. |
| 2011/0006466 A1* | 1/2011 | Ichikawa ............... F16F 13/105 267/140.13 |
| 2011/0101581 A1* | 5/2011 | Kubo ................... F16F 13/106 267/140.13 |
| 2013/0069289 A1* | 3/2013 | Ishikawa ............... F16F 13/106 267/140.13 |

FOREIGN PATENT DOCUMENTS

| | | |
|---|---|---|
| JP | A-2009-228688 | 10/2009 |
| JP | 2010-007845 A | 1/2010 |
| JP | B2-4861843 | 1/2012 |

OTHER PUBLICATIONS

Oct. 13, 2015 Office Action issued in Japanese Application No. 2012-160619.

* cited by examiner

ID BY REFERENCE

FLUID-FILLED VIBRATION DAMPING DEVICE

INCORPORATED BY REFERENCE

The disclosure of Japanese Patent Application No. 2012-160619 filed on Jul. 19, 2012, including the specification, drawings and abstract is incorporated herein by reference in its entirety. This is a Continuation of International Application No. PCT/JP2013/004187 filed on Jul. 5, 2013.

BACKGROUND OF THE INVENTION

1. Field of the Invention

The present invention relates to a fluid-filled vibration damping device utilizing vibration damping effects based on the flow behavior of a fluid sealed therein.

2. Description of the Related Art

Conventionally, there has been known a fluid filled vibration damping device utilizing vibration damping effects based on the flow behavior of a fluid sealed therein as a kind of vibration damping coupling body or vibration damping supporting body interposed between the members constituting a vibration transmission system. This vibration damping device has a structure where a first mounting member and a second mounting member are elastically connected by a main rubber elastic body, and a pressure-receiving chamber with part of its wall made of the main rubber elastic body and an equilibrium chamber with part of its wall made of a flexible film are formed, both chambers containing a non-compressible fluid sealed therein, and an orifice passage is formed through which the pressure-receiving chamber and the equilibrium chamber communicate with each other. The fluid-filled vibration damping devices with the structure described above include the one disclosed in U.S. Pat. No. 8,556,239, for example, and their application to engine mounts, body mounts, suspension member mounts and differential mounts of motor vehicles, and even to suspension bushes has been under consideration.

By the way, in case of applying a fluid-filled vibration damping device to an engine mount and the like, vibration damping effect is required against vibration in each of multiple frequency bands. Therefore, U.S. Pat. No. 8,556,239 presents a obstructing rubber elastic plate for the purpose of obtaining effective vibration damping effect against vibration with a higher frequency than the tuning frequency of the orifice passage. Then, against high-frequency, small-amplitude vibration, vibration damping effect obtained by low dynamic spring behavior is exerted by means of releasing the pressure in the pressure-receiving chamber into the equilibrium chamber triggered by a slight deformation of the obstructing rubber elastic plate.

However, as a result of further studies conducted by the inventor of the present invention regarding the fluid-filled vibration damping device described in U.S. Pat. No. 8,556,239, it was made known that there is some room for further improvement. In other words, in the structure of U.S. Pat. No. 8,556,239, the liquid pressure absorption effect is exerted due to a slight deformation of the obstructing rubber elastic plate in the thickness direction based on relative pressure fluctuation between the pressure-receiving chamber and the equilibrium chamber under a condition where the communication aperture that connects the pressure-receiving chamber and the equilibrium chamber with each other is shut off by the obstructing rubber elastic plate. In such structure as described above, vibration damping effect due to the orifice passage can be obtained effectively, while the wall spring rigidity of the pressure-receiving chamber is made higher based on the elasticity of the obstructing rubber elastic plate than when the pressure-receiving chamber and the equilibrium chamber communicate with each other, which poses a risk of not being able to cope with higher requirements for vibration isolation effect by low dynamic spring behavior.

SUMMARY OF THE INVENTION

The present invention was made against the background described above, and the problems to be solved are to provide a fluid-filled vibration damping device with an improved structure where excellent vibration damping performance (vibration isolation effect by low dynamic spring) can be obtained during vibration input of higher frequency than the tuning frequency of the orifice passage.

That is, a first aspect of the present invention provides a fluid-filled vibration damping device including: a first mounting member; a second mounting member; a main rubber elastic body connecting the first and second mounting members; a pressure-receiving chamber whose wall portion is partially defined by the main rubber elastic body; an equilibrium chamber whose wall portion is partially defined by a flexible film, the pressure-receiving chamber and the equilibrium chamber containing a non-compressible fluid sealed therein; an orifice passage through which the pressure-receiving chamber and the equilibrium chamber communicate with each other; a partition member that separates the pressure-receiving chamber from the equilibrium chamber while having a communication aperture through which the pressure-receiving chamber and the equilibrium chamber communicate; and an elastic rubber plate arranged so as to cover the communication aperture by being superposed thereon from a pressure-receiving chamber side so that pressure in the pressure-receiving chamber is applied to a first surface of the elastic rubber plate while pressure in the equilibrium chamber is applied to a second surface thereof via the communication aperture, wherein the elastic rubber plate includes one or more contact retaining portions that are provided on an outer peripheral edge thereof and retained in contact against the partition member, and a deformation-allowing region that is provided between circumferentially opposite ends of one or two of the contact retaining portions of the elastic rubber plate and that is elastically deformable based on pressure differential between the pressure-receiving chamber and the equilibrium chamber, and a gap is formed between the deformation-allowing region and the partition member so that a communication passage is constituted by including the gap through which the pressure-receiving chamber and the equilibrium chamber communicate with each other.

According to the fluid-filled vibration damping device with the structure following the first aspect of the present invention, the communication passage is formed to include the gap created between the deformation-allowing region of the elastic rubber plate and the partition member, and the pressure-receiving chamber and the equilibrium chamber communicate with each other via the communication passage. This allows the vibration isolation effect by low dynamic spring behavior to be effectively exerted based on the resonance effect of the fluid flowing through the communication passage, thus improving the vibration damping performance.

In addition, when the pressure in the pressure-receiving chamber is heightened by an input of large-amplitude vibration, the deformation-allowing region of the elastic rubber plate is elastically deformed toward the gap based on relative pressure differential between the pressure-receiving chamber and the equilibrium chamber to have the communication passage shut off by the deformation-allowing region. As a result, the liquid pressure in the pressure-receiving chamber is prevented from escaping into the equilibrium chamber to effectively activate the fluid flow through the orifice passage so that the vibration damping effect based on the resonance effect of the fluid flowing through the orifice passage is effectively exerted, thus enhancing the vibration damping performance.

Further, when the pressure in the pressure receiving chamber is lowered by an input of large-amplitude vibration, the deformation-allowing region of the elastic rubber plate is elastically deformed based on relative pressure differential between the pressure-receiving chamber and the equilibrium chamber to enlarge the gap. This increases the amount of fluid flowing through the communication passage to let the fluid effectively flow into the pressure-receiving chamber through the communication passage. Therefore, the negative pressure in the pressure-receiving chamber is reduced or eliminated as soon as possible to prevent any abnormal noise caused by cavitation.

A second aspect of the present invention provides the fluid-filled vibration damping device according to the first aspect, wherein the partition member includes a recess that opens up on its surface on the pressure-receiving chamber side and the recess communicates with the communication aperture, and an edge of the recess on a side of the communication aperture is covered by the deformation-allowing region of the elastic rubber plate so as to form the gap.

According to the second aspect, since the gap is formed by covering the opening of the recess formed in the rigid partition member by the deformation-allowing region, the configuration of the communication passage comprising the gap can be stabilized. Therefore, by means of adjusting the configuration of the recess, the communication passage can be switched on and off in high precision so as to obtain excellent vibration damping effect for over a wide range of vibration input frequency.

A third aspect of the present invention provides the fluid-filled vibration damping device according to the first or second aspect, wherein the deformation-allowing region of the elastic rubber plate includes an isolated portion whose surface on an equilibrium chamber side is located closer to the pressure-receiving chamber side than a surface of the contact retaining portion on the equilibrium chamber side, and the contact retaining portion is abutted against a surface of the partition member on the pressure-receiving chamber side while the isolated portion of the deformation-allowing region is arranged to be separated from the surface of the partition member on the pressure-receiving chamber side so as to form the gap.

According to the third aspect, the gap is formed by the elastic rubber plate without providing a special recess and the like on the side of the partition member, thus enabling to provide the communication passage in an easy manner.

A fourth aspect of the present invention provides the fluid-filled vibration damping device according to any one of the first to third aspects, wherein a cutout is formed between a circumferential end of the deformation-allowing region and one of the circumferentially opposite ends of one or two of the contact retaining portions adjacent thereto so that the deformation-allowing region is separated from the contact retaining portion in a circumferential direction by the cutout.

According to the fourth aspect, constraints on the deformation-allowing region due to the contact retaining portion are reduced by the formation of the cutout allowing the deformation-allowing region to be elastically deformed more easily and more appreciably. Therefore, the communication passage is rapidly shut off by the deformation-allowing region, while the cross sectional area of the communication passage is maintained larger when negative pressure is applied to the pressure-receiving chamber, thus effectively preventing cavitation.

A fifth aspect of the present invention provides the fluid-filled vibration damping device according to any one of the first to third aspects, wherein a low spring part is formed between a circumferential end of the deformation-allowing region and one of the circumferentially opposite ends of one or two of the contact retaining portions adjacent thereto and is elastically deformable more easily than the deformation-allowing region.

According to the fifth aspect, constraints on the deformation-allowing region due to the contact retaining portion is reduced by the elastic deformation of the low spring part allowing the deformation-allowing region to be elastically deformed more easily and more appreciably. Therefore, the communication passage is rapidly shut off by the deformation-allowing region, while the cross sectional area of the communication passage is maintained larger when negative pressure is applied to the pressure-receiving chamber, thus effectively preventing cavitation. In addition, since the deformation-allowing region and the contact retaining portion are connected to each other in the circumferential direction by the low spring part, failures such as a leak of fluid from between the deformation-allowing region and the contact retaining portion in the circumferential direction can be avoided.

A sixth aspect of the present invention provides the fluid-filled vibration damping device according to any one of the first to fifth aspects, wherein the one or more contact retaining portions are formed of one or more thick rubber parts, a press retaining member is provided on an opposite side from the partition member across the thick rubber part so that the thick rubber part is pressed by the press retaining member against the partition member to be elastically held clamped, and the deformation-allowing region located between circumferentially opposite ends of one or two of the thick rubber parts is made thinner than the thick rubber part.

According to the sixth aspect, since the contact retaining portion is formed of the thick rubber part, the amount of compression deformation allowed for the contact retaining portion is made larger, thus securing the durability along the outer peripheral end of the elastic rubber plate that is held clamped between the partition member and the press retaining member. In addition, because of the thickened portion along the outer peripheral end of the elastic rubber plate, the configuration of the outer peripheral end of the elastic rubber plate is stabilized enabling to accurately set the tuning frequency of the communication passage, while allowing the communication passage to be switched on and off in high precision.

A seventh aspect of the present invention provides the fluid-filled vibration damping device according to any one of the first to sixth aspects, wherein the elastic rubber plate includes a central mounting portion integrally formed with its central portion and the central mounting portion is mounted to the partition member in a fixed state, a spoke-shaped retaining portion is provided so as to extend peripherally outward from the central mounting portion, and the contact retaining portion is provided at a tip of the spoke-shaped retaining portion so as to extend in a circumferential direction therefrom.

According to the seventh aspect, the fixing force exerted on the central mounting portion to have it fixed to the partition member is transmitted to the contact retaining portion via the spoke-shaped retaining portion so that the outer peripheral end of the elastic rubber plate is stably held at the contact retaining portion in a state of abutting against the partition member. As a result, the configuration of the communication passage is stabilized, thus achieving vibration damping effect against vibration input in each of multiple frequency bands.

According to the present invention, the communication passage that connects the pressure-receiving chamber and the equilibrium chamber with each other is configured by using the gap formed between the elastic rubber plate and the partition member. This allows the vibration damping effect based not only on the liquid pressure absorption effect due to a slight deformation of the elastic rubber plate but also on the resonance effect of the fluid flowing through the communication passage to be exerted at the time of input of medium to high frequency, small-amplitude vibration, thus further enhancing the vibration damping performance. Furthermore, when the pressure in the pressure-receiving chamber is increased by the input of a low-frequency, large-amplitude vibration, the communication passage is shut off by the deformation-allowing region that covers the opening of the gap and partially constitutes the wall of the communication passage to prevent the liquid pressure in the pressure-receiving chamber from escaping into the communication passage, thus effectively exerting the vibration damping effect caused by the fluid flowing through the orifice passage. In addition, once pressure within the pressure-receiving chamber is decreased by a high-load input, the cross sectional area of the communication passage is enlarged by the elastic deformation of the deformation-allowing region to increase the amount of fluid flowing through the communication passage so that the negative pressure in the pressure-receiving chamber is reduced promptly, thus preventing any abnormal noise caused by cavitation.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Embodiments of the present invention will be described below in reference to the drawings.

Figure 1:
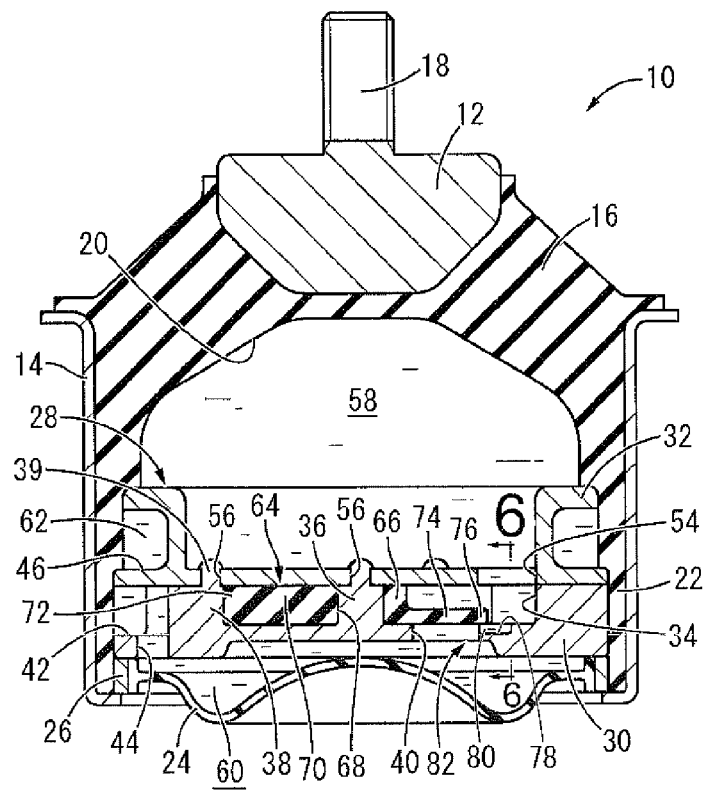
FIG. 1 is a longitudinal cross sectional view showing a fluid-filled vibration damping device in the form of an engine mount as a first embodiment of the present invention, taken along line 1-1 of FIG. 2.

FIG. 1 shows an engine mount 10 for motor vehicles as a first embodiment of a fluid-filled vibration damping device with the structure according to the present invention. The engine mount 10 has a structure where a first mounting member 12 and a second mounting member 14 are connected to each other by a main rubber elastic body 16. Then, by means of having the first mounting member 12 mounted to an unillustrated power unit and the second mounting member 14 mounted to an unillustrated vehicular body, the power unit is connected to the vehicular body in a vibration damping manner. Unless otherwise noted, the 'up-down direction' in the following descriptions means the up-down direction in FIG. 1, which is the mount axis direction. Also, FIG. 1 shows the engine mount 10 as a single unit before being mounted to a motor vehicle, but once it is mounted thereto, the shared support load of the power unit is inputted in the mount axis direction so that the main rubber elastic body 16 is elastically deformed in such a way that the first mounting member 12 and the second mounting member 14 get closer to each other in the mount axis direction.

More specifically, the first mounting member 12 is in a circular block shape where a mounting bolt 18 is provided to protrude upward. By having the mounting bolt 18 fastened to the power unit, the first mounting member 12 gets mounted to the power unit.

Meanwhile, the second mounting member 14 is in an approximate shape of a large-diameter circular cylinder to be mounted to the vehicular body via an unillustrated bracket. At the top end of the second mounting member 14, a flange is integrally formed protruding toward the outer periphery.

Then, the first mounting member 12 is arranged above the second mounting member 14, and the first mounting member 12 and the second mounting member 14 are elastically connected to each other by the main rubber elastic body 16. The main rubber elastic body 16 is in an approximate shape of a thick-walled large-diameter truncated circular cone, and the first mounting member 12 is bonded by vulcanization to the small-diameter end thereof, while the inner peripheral surface of the second mounting member 14 is superposed on the outer peripheral surface of the large-diameter end of the same to be bonded by vulcanization. This allows the first mounting member 12 and the second mounting member 14 to be elastically connected to each other by the main rubber elastic body 16, while the upper opening of the second mounting member 14 is closed liquid-tight by the main rubber elastic body 16. The main rubber elastic body 16 is formed as an integrally vulcanization molded component equipped with the first mounting member 12 and the second mounting member 14.

In addition, the main rubber elastic body 16 is provided with a large-diameter recess 20 in an approximate shape of an upside-down bowl formed to open to the end surface on the large-diameter side. Furthermore, the main rubber elastic body 16 is integrally formed with a sealing rubber layer 22. The sealing rubber layer 22 is in an approximate shape of a thin-walled large-diameter circular cylinder formed to protrude downward from the outer peripheral end of the main rubber elastic body 16 being fixed to the second mounting member 14 to cover the inner peripheral surface thereof.

Also, at the lower opening of the second mounting member 14, a flexible film 24 is attached. The flexible film 24 is made of a thin and easy-to-deform rubber film in a circular shape as a whole, and a fixing member 26 is adhered to the outer peripheral edge thereof. The fixing member 26 is fitted and fixed to the second mounting member 14 via the sealing rubber layer 22 by means of inserting the fixing member 26 into the lower edge of the second mounting member 14 and treating it with a diameter-reducing process such as the 360-degree radial compression. This allows the flexible film 24 to be attached to the second mounting member 14 and the lower opening of the second mounting member 14 to be closed liquid-tight by the flexible film 24.

Figure 2:
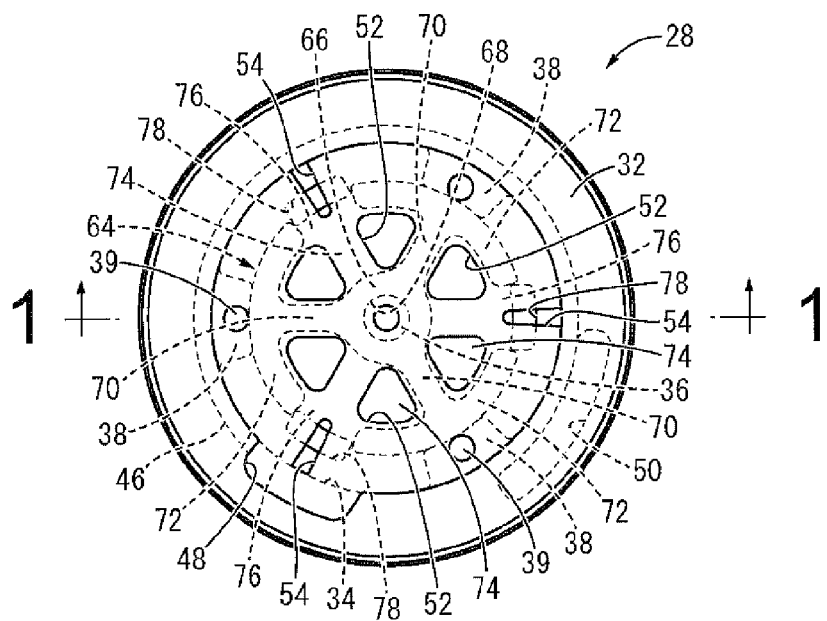
FIG. 2 is a plan view of an orifice member constituting the engine mount shown in FIG. 1.

Also, an orifice member 28 is arranged between the main rubber elastic body 16 and the flexible film 24 facing each other in the axial direction. As shown in FIG. 2, the orifice member 28 is in an approximate shape of a circular plate as a whole and is made of metal such as iron or aluminum alloy, or a rigid material formed with synthetic resin such as polypropylene, polyamide and so forth. In addition, the orifice member 28 comprises a partition member 30 and a cover member 32 serving as a press retaining member.

Figure 3:
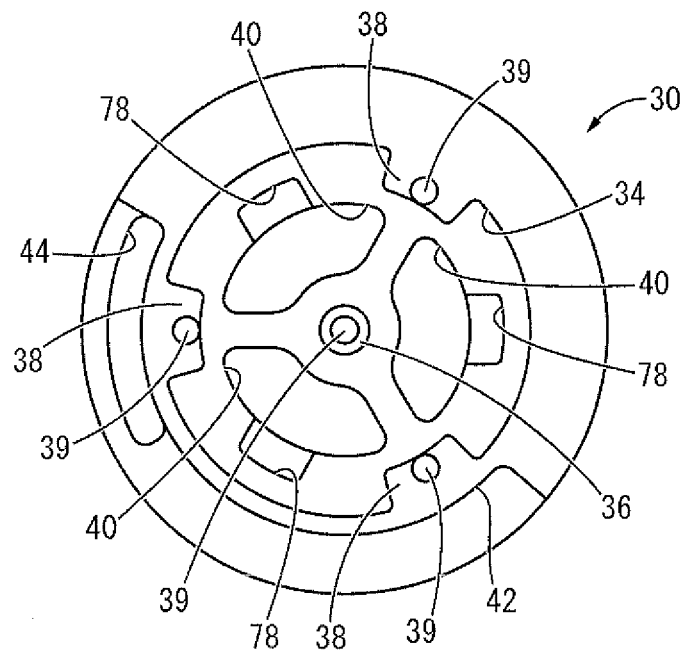
FIG. 3 is a plan view of a partition member constituting the orifice member shown in FIG. 2.

As shown in FIG. 3, the partition member 30 is in an approximate shape of a circular plate where a containing recess 34 is formed in a circular shape opening upward at the center in the radial direction. At the center of the containing recess 34 in the redial direction, a central protrusion 36 is arranged to protrude from the bottom wall thereof, while a plurality of outer peripheral protrusions 38 are provided at equal intervals along the peripheral wall of the containing recess 34 to protrude inward in the radial direction. On each upper end face of the central protrusion 36 and each outer peripheral protrusion 38, a locking protrusion 39 is arranged to protrude therefrom. Also, on the bottom wall around the central protrusion 36 on the center side of the containing recess 34, a plurality of communication apertures 40 in an approximate shape of a fan are formed separate from each other in the circumferential direction. In addition, a lower peripheral groove 42 is formed extending continuously in a given length in the circumferential direction to open to the upper and outer peripheral faces along the outer periphery of the partition member 30, while an opening 44 is formed at one end of the lower peripheral groove 42 in the circumferential direction to open to the lower end face of the partition member 30.

Meanwhile, the cover member 32 is in an approximate shape of a bottomed shallow circular cylinder. In the cylindrical portion of the cover member 32, an upper peripheral groove 46 is formed extending continuously in a given length in the circumferential direction to open to the outer peripheral face, and an opening 48 is formed at one end of the upper peripheral groove 46 to open to the inner peripheral face, while a connection window 50 is formed at the other end of the upper peripheral groove 46 in the circumferential direction to open to the lower end face of the cover member 32. Also, a plurality of through holes 52 are formed penetrating through the bottom wall of the cover member 32 on the center side separated from each other in the circumferential direction, while a plurality of communication holes 54 are formed extending in the longitudinal direction to penetrate through the bottom wall on the outer peripheral side separated from each other in the circumferential direction. In addition, at locations different from the communication holes 54 toward the center of the bottom wall of the cover member 32 and on the outer peripheral side thereof, a plurality of locking holes 56 are formed to penetrate therethrough.

The cover member 32 is superposed on the partition member 30 from above to have each locking protrusion 39 of the partition member 30 to be inserted and locked into each locking hole 56 of the cover member 32. This allows the partition member 30 and the cover member 32 to be aligned in the circumferential direction while being fixed to each other so as to form the orifice member 28. Also, the opening of the containing recess 34 of the partition member 30 is covered by the cover member 32. In addition, the upper opening of the lower peripheral groove 42 of the partition member 30 is covered by the cover member 32, while opposite ends of the lower peripheral groove 42 and the upper peripheral groove 46 of the cover member 32 are aligned and connected with each other via the connection window 50. This allows the upper peripheral groove 46 and the lower peripheral groove 42 to be serially connected so as to form a peripheral groove extending helically in a given length along the outer periphery of the orifice member 28.

By having the orifice member 28 internally inserted into the second mounting member 14 prior to mounting the above-described flexible film 24 to the second mounting member 14, the orifice member 28 is fitted and fixed to the second mounting member 14 via the sealing rubber layer 22.

This allows the main rubber elastic body 16 and the flexible film 24 facing each other in the axial direction to be divided into two sections in a liquid-tight manner by the orifice member 28. Then, on one side of the orifice member 28 (upper side in FIG. 1), a pressure-receiving chamber 58 whose wall portion is partially defined by the main rubber elastic body 16 is formed causing pressure fluctuation therein at the time of vibration input. Meanwhile, on the other side of the orifice member 28 (lower side in FIG. 1), an equilibrium chamber 60 whose wall portion is partially defined by the flexible film 24 is formed easily allowing volume changes therein. In each of the pressure receiving chamber 58 and the equilibrium chamber 60, a non-compressible fluid is sealed in. The non-compressible fluid to be sealed in is not particularly limited, but for example, water, alkylene glycol, polyalkylene glycol, silicone oil, or a mixture liquid thereof and the like can be favorably adopted. Furthermore, in order to efficiently obtain the vibration damping effect based on the flow behavior of the fluid described later, it is desirable to adopt a fluid of low viscosity at 0.1 Pa·s or less.

Also, by having the upper and lower peripheral grooves 46, 42 of the orifice member 28 covered liquid-tight by the second mounting member 14 via the sealing rubber layer 22, an orifice passage 62 is formed extending in a given length along the outer periphery of the orifice member 28 in a helical manner. One end of the orifice passage 62 is connected to the pressure-receiving chamber 58 via the opening 48, while the other end thereof is connected to the equilibrium chamber 60 via the opening 44 so that the pressure-receiving chamber 58 and the equilibrium chamber 60 communicate with each other via the orifice passage 62. Now, the resonance frequency of the fluid flowing through the orifice passage 62 (tuning frequency of the orifice passage 62) is set based on the ratio (A/L) of the passage section area (A) to the passage length (L), and in the present embodiment, it is set to a low frequency at about 10 Hz, for example, which is equivalent to that of the engine shake of motor vehicles.

Also, the containing recess 34 in an annular shape formed in the partition member 30 is covered by the cover member 32 and communicates with the pressure-receiving chamber 58 via the through hole 52 and the communication hole 54 of the cover member 32, while communicating with the equilibrium chamber 60 via the communication aperture 40 of the partition member 30. In other words, the communication aperture 40 of the partition member 30 is provided so that the pressure-receiving chamber 58 and the equilibrium chamber 60 communicate with each other therethrough.

Figure 4:
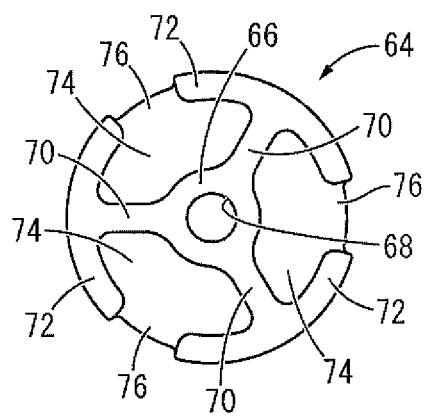
FIG. 4 is a plan view of an elastic rubber plate constituting the orifice member shown in FIG. 2.

Also, the containing recess 34 is provided with an elastic rubber plate 64. The elastic rubber plate 64, as shown in FIG. 4, is in an approximate shape of a circular plate as a whole. Also, at the center of the elastic rubber plate 64 in the radial direction, a central mounting portion 66 is integrally formed. Then, the central protrusion 36 of the partition member 30 is inserted through an inner hole 68 of the central mounting portion 66 so as to have the bottom face of the central mounting portion 66 abutted against the upper face of the bottom wall of the containing recess 34 on the inner peripheral side than each communication aperture 40, while the upper face of the central mounting portion 66 is abutted against the lower face of the cover member 32 on the inner peripheral side than each through hole 52. This allows the central mounting portion 66 to be mounted to the partition member 30 and the cover member 32 in a fixed state.

In addition, the elastic rubber plate 64 is provided with three spoke-shaped retaining portions 70, 70, 70 which are formed at equal intervals in the circumferential direction and extend in a spoke-wise fashion from the central mounting portion 66 toward the outer periphery of the elastic rubber plate 64. Then, each spoke-shaped retaining portion 70 is arranged in between the bottom wall between the communication apertures 40, 40 of the containing recess 34 adjacent to each other in the circumferential direction and the bottom wall between the plurality of through holes 52 of the cover member 32 located opposite the bottom wall mentioned earlier in the axial direction.

Furthermore, the elastic rubber plate 64 is superposed on each communication aperture 40 of the partition member 30 so as to cover its entirety, and the outer peripheral edge of the elastic rubber plate 64 is located outside the outer peripheral edge of each communication aperture 40 in the radial direction. Especially in the present embodiment, the outer peripheral edge of the elastic rubber plate 64 is located outside each through hole 52 of the cover member 32 in the radial direction. In addition, the outer peripheral edge of the communication hole 54 of the cover member 32 extends outward in the radial direction away from the position opposing the elastic rubber plate 64 in the cover member 32.

Moreover, along the outer peripheral edge of the elastic rubber plate 64, three contact retaining portions 72, 72, 72 each in an arc shape are formed at equal intervals in the circumferential direction, wherein the central portion of each contact retaining portion 72 in the circumferential direction is connected to the outer peripheral edge of the spoke-shaped retaining portion 70 extending radially outward in a spoke-wise fashion from the central mounting portion 66.

In the elastic rubber plate 64 of the present embodiment, the thickness of the central mounting portion 66, the spoke-shaped retaining portion 70, and the contact retaining portion 72 are all made similar to each other at a dimension larger than that between the opposing faces of the bottom wall of the cover member 32 and the bottom wall of the containing recess 34 in the partition member 30 (distance between two bottom walls in the axial direction). This allows the central mounting portion 66, spoke-shaped retaining portion 70, and the contact retaining portion 72 to be compressed between the two bottom walls of the partition member 30 in the containing recess 34 and the cover member 32 in the axial direction, while such a state of compression deformation is maintained by the fixing force of the partition member 30 and the cover member 32 so that the central mounting portion 66, the spoke-shaped retaining portion 70, and the contact retaining portion 72 are elastically held clamped by the orifice member 28. This allows the elastic rubber plate 64 to be superposed on the partition member 30 from above to be retained in contact against each other.

Furthermore, in the elastic rubber plate 64, the outer peripheral face of the circumferential center of each contact retaining portion 72 is pressed against the inner peripheral surface of each outer peripheral protrusion 38 in the radial direction. This allows the elastic rubber plate 64 to be positioned against the partition member 30 in the radial direction being arranged at a given location in the containing recess 34.

Meanwhile, in the elastic rubber plate 64, the thickness of the region in an approximate shape of a fan enclosed by the spoke-shaped retaining portions 70, 70 adjacent to the central mounting portion 66 in the circumferential direction and the contact retaining portions 72, 72 connected to these spoke-shaped retaining portions 70, 70 are made small enough compared to the dimension of the gap between the opposing faces of the bottom wall of the cover member 32 and the bottom wall of the containing recess 34 in the partition member 30 in the axial direction. The elastic rubber plate 64 is provided with three such fan-shape regions at equal intervals in the circumferential direction, and each fan-shape region is made larger than each communication aperture 40, while being positioned against each communication aperture 40 in the circumferential direction to be arranged to cover each communication aperture 40 in its entirety. Also, such fan-shape regions are arranged to oppose the cover member 32 in the direction of superposition of the elastic rubber plate 64 and the partition member 30. Then, the pressure in the pressure-receiving chamber 58 is exerted on a first side of each fan-shape region via the through hole 52 and the communication hole 54 of the cover member 32, while the pressure in the equilibrium chamber 60 is exerted on a second side thereof via the communication aperture 40 of the partition member 30. In summary, under a condition where the elastic rubber plate 64 is superposed on the partition member 30, a movable film portion 74 is formed of such fan-shape region that allows elastic deformation in the thickness direction in accordance with the pressure differential between the pressure-receiving chamber 58 and the equilibrium chamber 60. The movable film portion 74 is integrally formed with the bottom edge of the central mounting portion 66, spoke-shaped retaining portion 70, and the contact retaining portion 72 while being superposed on the bottom wall surface of the containing recess 34 in the partition member 30.

Furthermore, the outer peripheral sides of the movable film portions 74 are integrally formed with elastic valve portions 76 serving as deformation-allowing regions, each of which is arranged between the contact retaining portions 72, 72 adjacent to each other in the circumferential direction. The elastic valve portion 76 is made thinner than the contact retaining portion 72 to be subject to elastic deformation easily, and its outer peripheral edge located outward from the outer peripheral edge of the communication aperture 40 in the radial direction while being located inward from the outer peripheral edge of the contact retaining portion 72 in the radial direction. The circumferential center of the outer peripheral end of each movable film portion 74 between the contact retaining portions 72, 72 of the elastic rubber plate 64 adjacent to each other in the circumferential direction is positioned against the circumferential center of the outer peripheral edge of each communication aperture 40 in the circumferential direction.

As evident from the description above, the thickness of the central mounting portion 66, the spoke-shaped retaining portion 70, and the contact retaining portion 72 are all made larger than that of the elastic valve portion 76. This allows the contact retaining portion 72 of the present embodiment to be formed of a thick rubber part thicker than the elastic valve portion 76 and the movable film portion 74, resulting in having higher rigidity than that of the movable film portion 74. Also, As evident from the fact that the contact retaining portion 72 is held clamped between the cover member 32 and the partition member 30, the cover member 32 of the present embodiment is arranged on the opposite side from the partition member 30 across the thick rubber part, thus functioning as a press retaining member that presses the thick rubber part against the partition member 30.

Under these circumstances, a recess 78 is formed in the partition member 30 opening on the bottom wall surface of the containing recess 34. As shown in FIGS. 1 and 3, the recess 78 opens to the top surface of the bottom wall of the containing recess 34 being formed on the outer peripheral side of the communication aperture 40, while the outer peripheral edge thereof is located in the middle in the radial direction not reaching the peripheral wall. Also, the three recesses 78, 78, 78 are formed at equal intervals in the circumferential direction, each being located in the circumferential center of each communication aperture 40, while the inner peripheral edge of each recess 78 is connected to each communication aperture 40.

Figure 5:
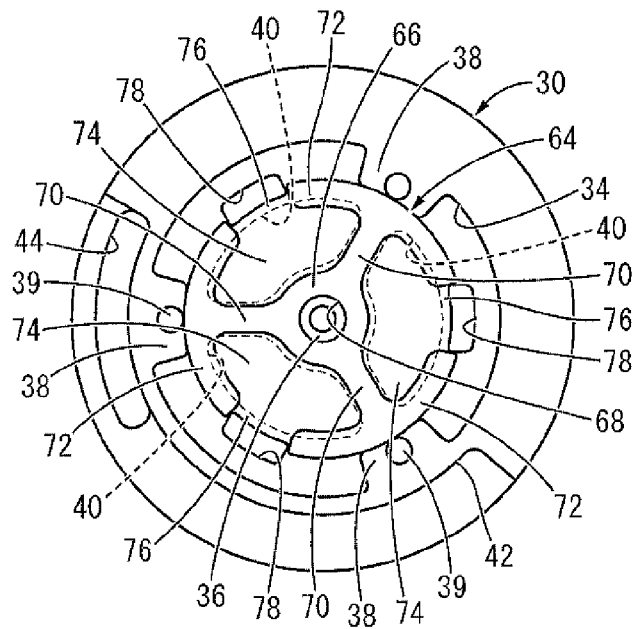
FIG. 5 is a plan view of the elastic rubber plate shown in FIG. 4 arranged in a containing recess of the partition member shown in FIG. 3.
Figure 6:
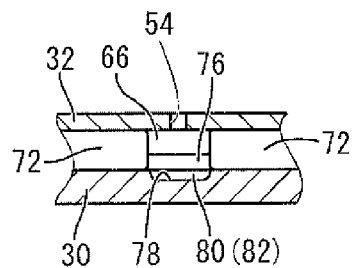
FIG. 6 is a partial cross sectional view of a principle part of a cross sectional view taken along line 6-6 of FIG. 1.

Then, as shown in FIGS. 1, 5 and 6, the upper opening of the inner peripheral edge of the recess 78 is covered by the elastic valve portion 76 of the elastic rubber plate 64 by having the elastic rubber plate 64 arranged in the containing recess 34, and a gap 80 is formed between the opposing faces of the bottom wall of the recess 78 and the elastic valve portion 76. In addition, the outer peripheral end of the recess 78 extends to reach the outer periphery of the elastic valve portion 76, and the upper opening on the outer peripheral end of the recess 78 is connected to the containing recess 34 on the outer peripheral side away from the elastic rubber plate 64. This allows the through hole 52, the communication hole 54, the containing recess 34, the gap 80, and the communication aperture 40 are serially connected, by which a communication passage 82 is provided to connect the pressure-receiving chamber 58 and the equilibrium chamber 60 to each other. Since the tuning frequency of the communication passage 82 is set higher than the tuning frequency of the orifice passage 62, for example, to a medium frequency at about a dozen Hz equivalent to that of the idling of a motor vehicle, or to a high frequency at more than a couple of dozen Hz equivalent to that of muffled noise of a running vehicle.

In addition, on the top surface of the elastic valve portion 76 of the elastic rubber plate 64, the liquid pressure in the pressure-receiving chamber 58 is exerted via the through hole 52 and the communication hole 54, while the liquid pressure in the equilibrium chamber 60 is exerted on the bottom surface via the communication aperture 40 and the gap 80. This allows the elastic valve portion 76 to be elastically deformed in the thickness direction due to relative liquid pressure fluctuations between the pressure-receiving chamber 58 and the equilibrium chamber 60.

In the engine mount 10 with the structure described above, once a low-frequency, large-amplitude vibration equivalent to the engine shake is inputted while being mounted to a motor vehicle, relative pressure differential will be produced between the pressure-receiving chamber 58 and the equilibrium chamber 60 to cause the fluid to flow through the orifice passage 62 between the pressure-receiving chamber 58 and the equilibrium chamber 60. Then, the vibration damping effect is exerted based on the fluid-flow effect.

Furthermore, at the time of input of large-amplitude vibration equivalent to the engine shake, the movable film portion 74 is constrained by the peripheral edge of the opening of the communication aperture 40 to limit the amount of elastic deformation so that enough relative pressure differential is produced between the pressure-receiving chamber 58 and the equilibrium chamber 60 to effectively cause the fluid to flow through the orifice passage 62. Especially in the present embodiment, since six through holes 52 are formed in the cover member 32, and the area of opening of each through hole 52 is made smaller than that of each communication aperture 40, the movable film portion 74 arranged superposed on the containing recess 34 on the side of the equilibrium chamber 60 is constrained of the amount of deformation both upward and downward.

Figure 7:
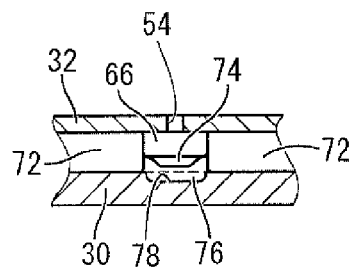
FIG. 7 is a longitudinal cross sectional view showing a principle part of the engine mount shown in FIG. 1 representing an operational state different from the one shown in FIG. 6.

Moreover, when a positive pressure is exerted on the pressure-receiving chamber 58 by an input of low-frequency, large-amplitude vibration, the gap 80 is blocked by the elastic valve portion 76 of the elastic rubber plate 64 by having the elastic valve portion 76 enter into the recess 78 based on the differential of pressure applied to the two sides thereof as shown in FIG. 7. Since this prevents the liquid from flowing through the communication passage 82, enough amount of liquid flowing through the orifice passage 62 is secured, thus enabling to favorably obtain the intended vibration damping effect.

Also, once mid- to high-frequency, small-amplitude vibration equivalent to the idling vibration or muffled noise of a running vehicle is inputted, the orifice passage 62 is substantially blocked by the anti-resonance, while the liquid pressure in the pressure-receiving chamber 58 is released into the equilibrium chamber 60 to be absorbed thereto by a slight deformation of the movable film portion 74. By such low dynamic spring behavior based on the liquid pressure absorption effect, the intended vibration damping effect (vibration isolation effect) can be exerted.

Also, the engine mount 10 is made in such a way that the vibration damping effect due to the communication passage 82 is exerted at the time of input of mid- to high-frequency, small-amplitude vibration. That is, at the time of input of mid- to high-frequency vibration, the amount of elastic deformation of the elastic valve portion 76 is made smaller to keep the gap 80 in a communicating state as shown in FIG. 6 causing the fluid to flow through the communication passage 82 between the pressure-receiving chamber 58 and the equilibrium chamber 60, thus effectively exerting the vibration damping effect based on the fluid-flow effect (vibration isolation effect by low dynamic spring). As evident from these examples, it is desirable to set the depth of the recess 78 in the right dimension for the elastic valve portion 76 to reach the bottom of the recess 78 at the time of input of large-amplitude vibration such as engine shake, while keeping the gap 80 without having the elastic valve portion 76 reach the bottom of the recess 78 at the time of small-amplitude vibration such as the idling vibration or muffled noise of a running vehicle.

Especially in the present embodiment, the gap 80 composing the communication passage 82 is configured by means of covering the upper opening of the recess 78 formed on the rigid partition member 30 by the elastic valve portion 76. Since the wall of the portion of the communication passage 82 defined by the gap 80 is thus made rigid over an extensive area, the configuration of the communication passage 82 is stabilized, thus achieving the intended vibration damping characteristics in a stable manner.

Also, in the present embodiment, three contact retaining portions 72 extending in the circumferential direction are provided, and each gap 80 is formed between these contact retaining portions 72 in the circumferential direction so as to cause the fluid to flow through the communication passage 82 more efficiently, thus enabling to favorably obtain the intended vibration damping effect.

Also, the elastic rubber plate 64 is held clamped between the partition member 30 and the cover member 32 at the central mounting portion 66, the spoke-shaped retaining portion 70, and the contact retaining portion 72, and the movable film portion 74 and the elastic valve portion 76 are pressed against the partition member 30. Therefore, the free length of the movable film portion 74 is shortened to limit the amount of elastic deformation thereof so that the liquid absorption effect is well constrained at the time of input of low-frequency, large-amplitude vibration. In addition, since the elastic valve portion 76 is provided between the contact retaining portions 72 in the circumferential direction, the elastic deformation of the elastic valve portion 76 is constrained, thus reducing or preventing striking noise generated when the elastic valve portion 76 blocks the communication passage 82.

Furthermore, since the central mounting portion 66, the spoke-shaped retaining portion 70, and the contact retaining portion 72 are formed of a thick rubber part thicker than the movable film portion 74 and the elastic valve portion 76, the permissible amount of compression deformation in the up-down direction is established at a high level for the central mounting portion 66, spoke-shaped retaining portion 70, and the contact retaining portion 72. Therefore, in the structure where the elastic rubber plate 64 is held clamped by the central mounting portion 66, spoke-shaped retaining portion 70, and the contact retaining portion 72, enough durability of the device can be ensured.

Figure 8:
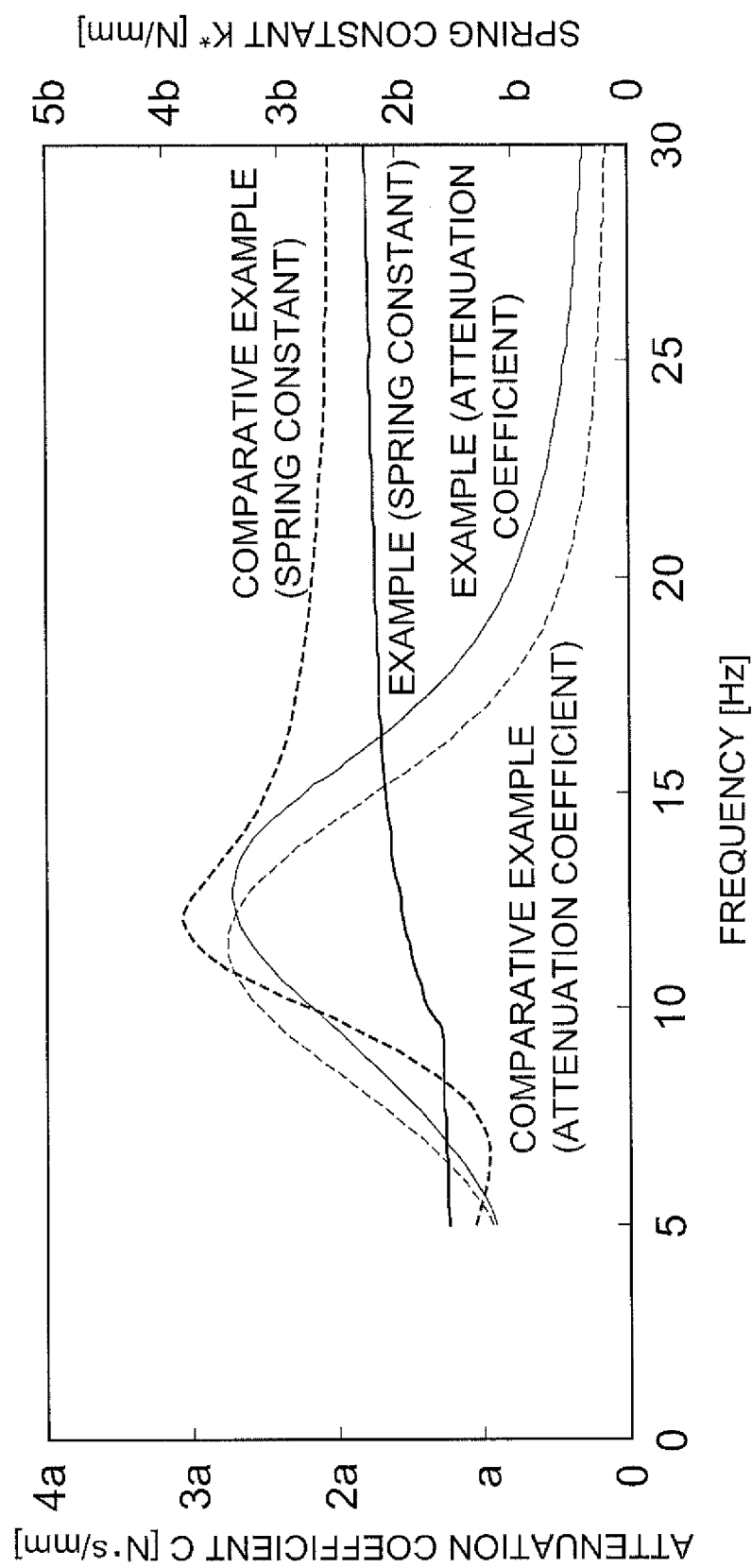
FIG. 8 is a graph showing vibration damping characteristics of the engine mount shown in FIG. 1.

As to the engine mount 10 relating to the present invention, it is verified by experiments that high attenuating effect is effectively obtained at the time of input of low-frequency, large-amplitude vibration, while excellent vibration isolation effect is exerted at the time of input of mid- to high-frequency, small-amplitude vibration. That is, according to the graph of experiment results shown in FIG. 8, it can be confirmed that attenuating performance is exerted at the time of input of large-amplitude (1 mm) vibration in the engine mount with the structure of the present invention shown by a fine solid line (example) at the same level as the engine mount with the conventional structure (comparative example) shown by a fine dash-line. Furthermore, at the time of input of small-amplitude (0.25 mm) vibration, the spring constant of the example shown by a bold solid line is significantly smaller than in the comparative example shown by a bold dash-line, which indicates that the vibration isolation effect by low dynamic spring is favorably exerted. As evident from the graph of FIG. 8, the tuning frequency of the communication passage 82 is set to a mid-frequency range around 10 to 15 Hz equivalent to that of the idling vibration. Also, the engine mount with the conventional structure (comparative example) has no gap between the elastic rubber plate and the partition member as opposed to the engine mount with the structure of the present invention (example).

Figure 9:
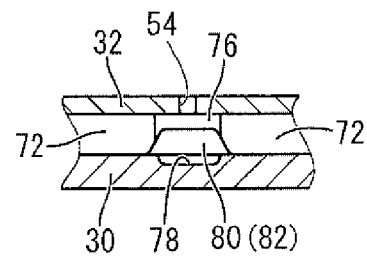
FIG. 9 is a longitudinal cross sectional view showing a principle part of the engine mount shown in FIG. 1 representing an operational state different from the one shown in either FIG. 6 or FIG. 7.

Meanwhile, when the inner pressure of the pressure-receiving chamber 58 is significantly reduced at a shockingly large impact load applied to a vehicle overriding a bump, for example, compensating the negative pressure in the pressure-receiving chamber 58 becomes more difficult only by fluid flow through the orifice passage 62 or by elastic deformation of the movable film portion 74 in the elastic rubber plate 64. Given that, once large negative pressure is applied to the pressure-receiving chamber 58 as shown in FIG. 9, the elastic valve portion 76 is lifted up toward the pressure-receiving chamber 58 by the force due to the differential of pressure exerted via the through hole 52 and communication hole 54. This makes the passage cross section area of the communication passage 82 larger to increase the amount of fluid flowing through the communication passage 82 so that the negative pressure in the pressure-receiving chamber 58 is reduced or eliminated as soon as possible, thus preventing generation of abnormal noise caused by cavitation.

In addition, in the present embodiment, the communication hole 54 is arranged above the opening of each gap 80 to the containing recess 34 so that the fluid flowing from the equilibrium chamber 60 into the containing recess 34 through the communication aperture 40 and the gap 80 can be promptly supplied to the pressure-receiving chamber 58 through the communication hole 54.

Figure 10:
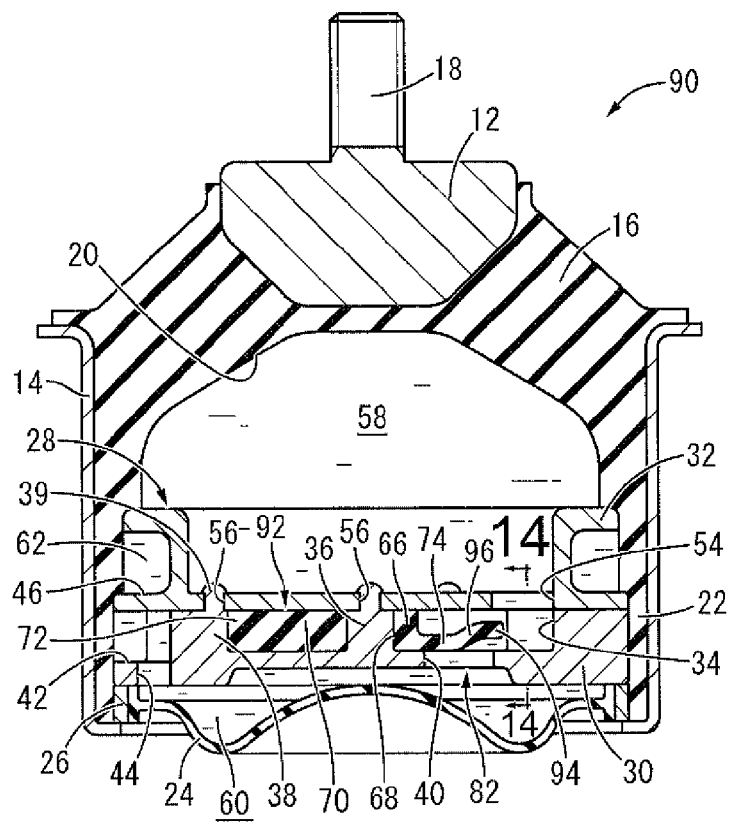
FIG. 10 is a longitudinal cross sectional view showing an engine mount as a second embodiment of the present invention.

FIG. 10 shows an engine mount 90 for motor vehicles as a second embodiment of the fluid-filled vibration damping device with the structure according to the present invention. The engine mount 90 has a structure where the containing recess 34 of the partition member 30 is provided with an elastic rubber plate 92. In the following paragraphs, detailed descriptions of substantially the same members and parts as those of the first embodiment are omitted by assigning the same numerals to the equivalent components.

Figure 11:
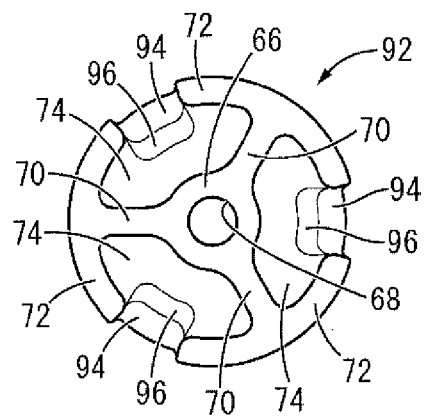
FIG. 11 is a plan view of an elastic rubber plate constituting the engine mount shown in FIG. 10.

The elastic rubber plate 92 has an elastic valve portion 94 serving as a deformation-allowing region circumferentially between each two of the three contact retaining portions 72, 72, 72 provided in the outer peripheral end thereof. As shown in FIGS. 10 and 11, the elastic valve portion 94 extends in approximately the axis-perpendicular direction above the movable film portion 74 in the axial direction with its inner peripheral edge integrally connected to the movable film portion 74 via a tapered portion 96 going up toward the outer periphery.

Figure 12:
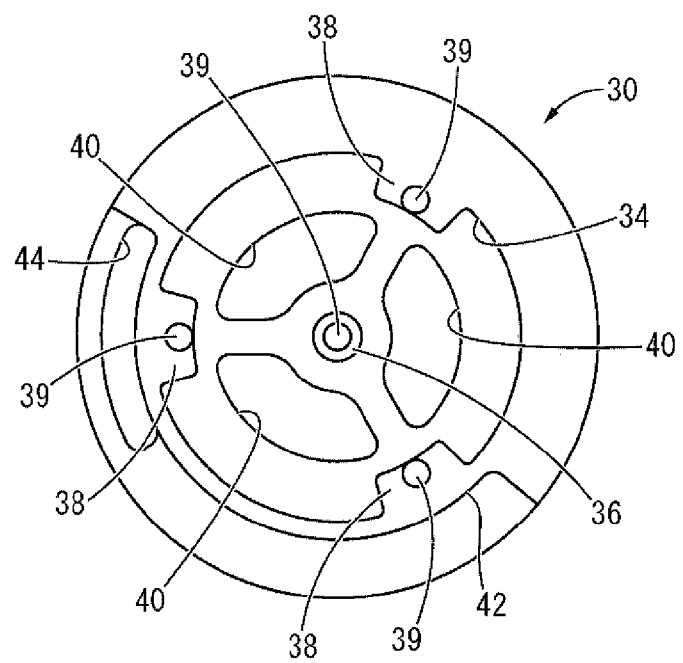
FIG. 12 is a plan view of a partition member constituting the engine mount shown in FIG. 10.

The elastic rubber plate 92 described above is arranged in the containing recess 34 of the partition member 30 shown in FIG. 12. The partition member 30 of the present embodiment has the structure of the partition member of the first embodiment without the recess 78.

Figure 13:
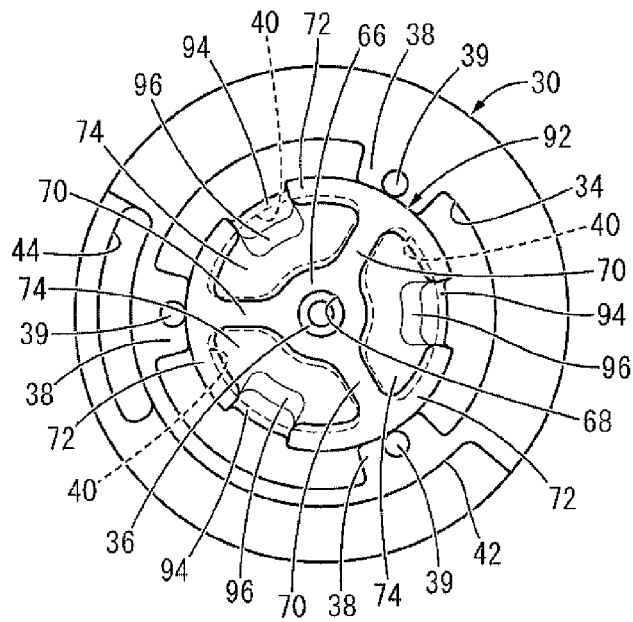
FIG. 13 is a plan view of the elastic rubber plate shown in FIG. 11 arranged in a containing recess of the partition member shown in FIG. 12.
Figure 14:
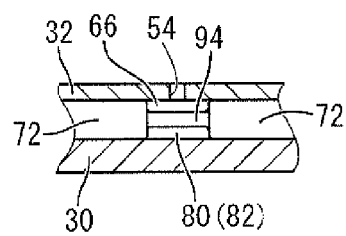
FIG. 14 is a partial cross sectional view of a principle part of a cross sec sectional view taken along line 14-14 of FIG. 10.

Then, as shown in FIGS. 10, 13 and 14, under a condition where the elastic rubber plate 92 is arranged in the containing recess 34, the elastic valve portion 94 and the tapered portion 96 are positioned above the upper face of the bottom wall of the containing recess 34 separated therefrom, while the gap 80 is formed between the opposing faces of the elastic valve portion 94 as well as the tapered portion 96 and the partition member 30. In addition, the inner peripheral edge of the tapered portion 96 extends over the opening of the communication aperture 40 so that the containing recess 34 and the equilibrium chamber 60 communicate with each other via the gap 80 and the communication aperture 40. With this arrangement, the communication passage 82 is constituted by including the gap 80 through which the pressure-receiving chamber 58 and the equilibrium chamber 60 communicate with each other.

In the present embodiment, the surface on the side of the equilibrium chamber 60 of the elastic valve portion 94 (lower face in FIG. 10) is located closer to the side of the pressure-receiving chamber 58 than the surface on the side of the equilibrium chamber 60 of the other part of the elastic rubber plate 92 that includes the contact retaining portion 72 so that the elastic valve portion 94 is entirely separated from the partition member 30 and serves as an isolated portion. Then, under a condition where the elastic rubber plate 92 is arranged in the containing recess 34, the central mounting portion 66, spoke-shaped retaining portion 70, contact retaining portion 72, and the movable film portion 74 are all abutted against the partition member 30, while the elastic valve portion 94 and the tapered portion 96 are all arranged above the partition member 30 separated therefrom.

In the engine mount 90 with the structure described above being mounted to a motor vehicle, once mid- to high frequency, small-amplitude vibration is inputted, the elastic valve portion 94 is maintained in a state of being separated from the partition member 30 as shown in FIG. 14, keeping the communication passage 82 open. Therefore, a fluid flow is generated between the pressure-receiving chamber 58 and the equilibrium chamber 60 through the communication passage 82, which results in exertion of vibration damping effect based on the fluid-flow in addition to the one based on the liquid pressure absorption effect due to a slight deformation of the elastic rubber plate 92.

Figure 15:
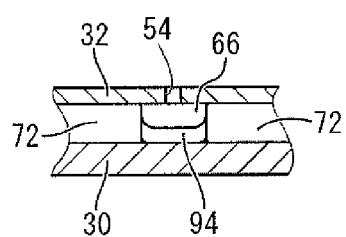
FIG. 15 is a longitudinal cross sectional view showing a principle part of the engine mount shown in FIG. 10 representing an operational state different from the one shown in FIG. 14.

Also, when the pressure in the pressure-receiving chamber 58 is significantly increased at the input of low-frequency, large-amplitude vibration, the elastic valve portion 94 and the tapered portion 96 are elastically deformed based on relative pressure differential between the pressure-receiving chamber 58 and the equilibrium chamber 60 so as to press the elastic valve portion 94 against the bottom wall of the containing recess 34 as shown in FIG. 15. This allows the communication passage 82 to be shut off by the elastic valve portion 94 to prevent liquid pressure in the pressure-receiving chamber 58 from escaping so that the fluid flow through the orifice passage 62 is effectively activated, thus effectively exerting the intended vibration damping effect.

Figure 16:
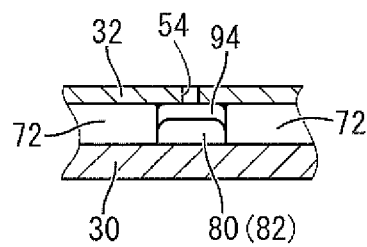
FIG. 16 is a longitudinal cross sectional view showing a principle part of the engine mount shown in FIG. 10 representing an operational state different from the one shown in either FIG. 14 or FIG. 15.

Also, when the pressure in the pressure-receiving chamber 58 is significantly lowered by a high-load input, the elastic valve portion 94 and the tapered portion 96 are significantly separated away from the bottom wall of the containing recess 34 as shown in FIG. 16, resulting in an increase in the gap 80. This makes the passage cross section area of the communication passage 82 larger to increase the amount of fluid flow per unit time so that more fluid is supplied from the equilibrium chamber 60 to the pressure-receiving chamber 58 through the communication passage 82. As a result, the negative pressure in the pressure-receiving chamber 58 is reduced or eliminated as soon as possible to prevent any abnormal noise caused by cavitation.

In the engine mount 90 of the present embodiment, since the communication passage 82 is formed by providing the elastic rubber plate 92 with an isolated portion that is formed concave toward the partition member 30, which renders the recess 78 unnecessary in the partition member 30, thus enabling to form the communication passage 82 in an easy manner. In addition, more extensive area over the wall of the communication passage 82 is defined by the elastic valve portion 94, thereby facilitating to achieve a prompt shutoff of the communication passage 82.

Figure 17:
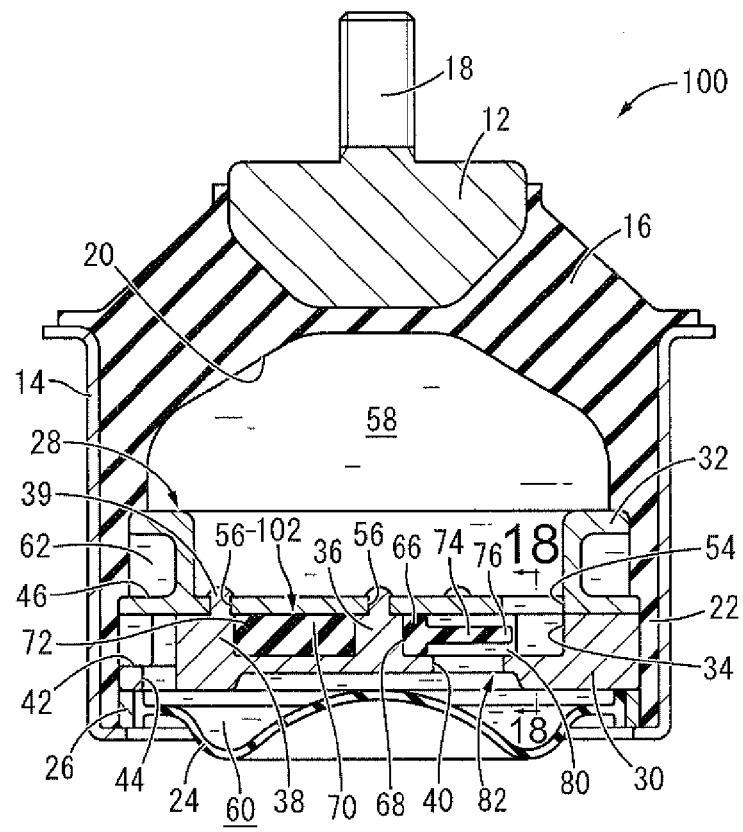
FIG. 17 is a longitudinal cross sectional view showing an engine mount as a third embodiment of the present invention.

FIG. 17 shows an engine mount 100 for motor vehicles as a third embodiment of the fluid-filled vibration damping device with the structure according to the present invention. The engine mount 100 has an elastic rubber plate 102.

The elastic rubber plate 102 is in an approximate shape of a circular plate as a whole and is formed by having the contact retaining portion 72, the central mounting portion 66, and the spoke-shaped retaining portion 70 each protruding to both sides in the thickness direction. In other words, the movable film portion 74 and the elastic valve portion 76 are integrally formed with the contact retaining portion 72, the central mounting portion 66, and the spoke-shaped retaining portion 70 at the center in the up-down direction extending in the axis-perpendicular direction.

Then, the elastic valve portion 76 and the movable film portion 74 are arranged above and opposed to the upper face of the bottom wall of the containing recess 34 separated therefrom by having the elastic rubber plate 102 inserted into the containing recess 34 of the partition member 30 and the contact retaining portion 72, the central mounting portion 66, and the spoke-shaped retaining portion 70 abutted against the upper face of the bottom wall of the containing recess 34. The elastic valve portion 76 and the movable film portion 74 are arranged under and opposed to the bottom face of the cover member 32 separated therefrom by a given distance and in the middle of the containing recess 34 in the up-down direction.

Figure 18:
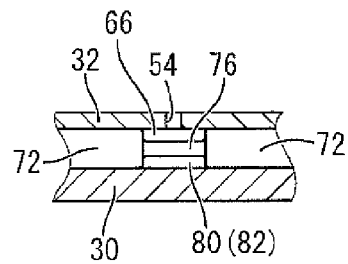
FIG. 18 is a partial cross sectional view showing a principle part of a cross sec sectional view taken along line 18-18 of FIG. 17.

Under a condition where the elastic rubber plate 102 described above is arranged in the containing recess 34, the gap 80 is formed between the opposing faces of the elastic valve portion 76 and the partition member 30 to be utilized to form the communication passage 82 (see FIGS. 17 and 18).

Figure 19:
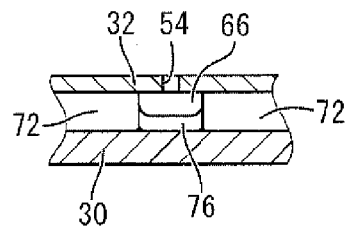
FIG. 19 is a longitudinal cross sectional view showing a principle part of the engine mount shown in FIG. 17 representing an operational state different from the one shown in FIG. 18.
Figure 20:
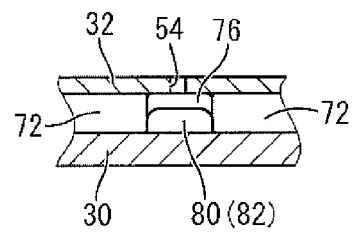
FIG. 20 is a longitudinal cross sectional view showing a principle part of the engine mount shown in FIG. 17 representing an operational state different from the one shown in either FIG. 18 or FIG. 19.

Even in the engine mount 100 of the present embodiment described above, the vibration damping effect due to the fluid flow through the communication passage 82 is effectively exerted in response to an input of mid- to high-frequency, small-amplitude vibration in the same way as the previously-described embodiment. In addition, in response to a large-amplitude input that causes positive pressure in the pressure-receiving chamber 58, the communication passage 82 is shut off by the elastic valve portion 76 to effectively exert the vibration damping effect by the orifice passage 62 as shown in FIG. 19. Meanwhile, when excessive negative pressure is applied to the pressure-receiving chamber 58, the gap 80 is increased by a deformation of the elastic valve portion 76 to enlarge the cross sectional area of the communication passage 82, as shown in FIG. 20 so that the amount of fluid flowing through the communication passage 82 is increased, thus enabling to obtain the effect of preventing abnormal noise due to cavitation.

Figure 21:
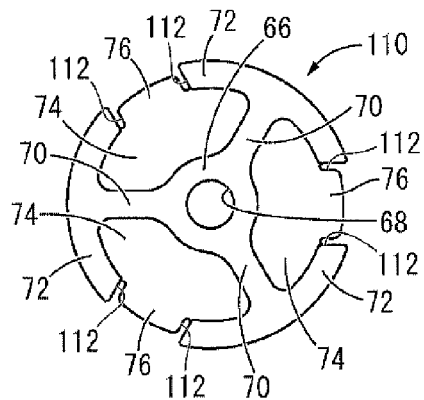
FIG. 21 is a plan view of an elastic rubber plate constituting an engine mount as a fourth embodiment of the present invention.

FIG. 21 shows an elastic rubber plate 110 composing the engine mount as a fourth embodiment of the fluid-filled vibration damping device with the structure according to the present invention. Since the engine mount of the present embodiment is made the same as the engine mount 10 of the first embodiment except the structure of the elastic rubber plate 110, the structure of the elastic rubber plate 110 will be described below.

That is, in the elastic rubber plate 110, a cutout 112 is formed between each circumferential end of the elastic valve portion 76 and the corresponding one of circumferentially opposite ends of the contact retaining portions 72 adjacent thereto. The cutout 112 is made in a form of a groove that opens toward the outer periphery of the elastic rubber plate 110 extending through the thickness thereof. Due to the formation of the cutout 112, the elastic valve portion 76 is separated from the contact retaining portion 72 in the circumferential direction. This allows the transmission of forces between the elastic valve portion 76 and the contact retaining portion 72 to be constrained at the time of elastic deformation of the elastic valve portion 76 preventing deformation thereof from being constrained by the contact retaining portion 72 that is made thicker. As a result, deformation of the elastic valve portion 76 is allowed more freely, thus achieving the shutoff of the communication passage 82 by the elastic valve portion 76 more rapidly and more securely.

Figure 22:
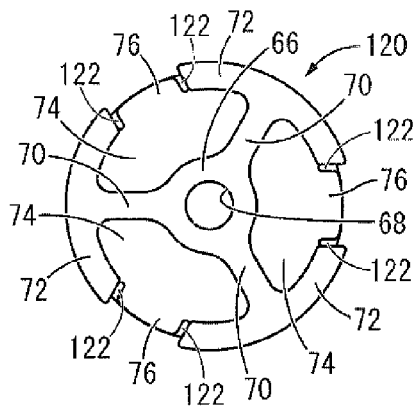
FIG. 22 is a plan view of an elastic rubber plate constituting an engine mount as another embodiment of the present invention.

As seen in the elastic rubber plate 120 shown in FIG. 22, the cutout 112 in the elastic rubber plate 110 of the fourth embodiment can be partially closed in the thickness direction to form a thin film part 122 serving as a low spring part that extends in the axis-perpendicular direction. The thin film part 122 is formed between each circumferential end of the elastic valve portion 76 and the corresponding one of the circumferentially opposite ends of the contact retaining portions 72 adjacent thereto and is subject to elastic deformation more easily by being made thinner than the elastic valve portion 76. Even in the elastic rubber plate 120 with such structure, the constraint of the elastic valve portion 76 imposed by the contact retaining portion 72 is limited by deformation of the thin film part 122 making the elastic valve portion 76 more subject to elastic deformation, thus achieving the shutoff of the communication passage 82 rapidly and securely.

Embodiments of the present invention have been described in detail above, but the present invention is not limited by those specific descriptions. For example, in the previously-described embodiment, a plurality of contact retaining portions 72 are provided and the elastic valve portion 76 was formed as a deformation-allowing region between each two of the contact retaining portions 72 in the circumferential direction, but the contact retaining portion and the deformation-allowing region can be formed only one each. More specifically, in an elastic rubber plate 130 shown in FIG. 23, a contact retaining portion 132 extends in the circumferential direction at a length short of one round to form a C-shape, while the single elastic valve portion 76 is formed between the circumferentially opposite ends of the single contact retaining portion 132. Thus, the shape and the number of formations of the contact retaining portion and elastic valve portion are to be set according to the required vibration damping characteristics and the like without being particularly limited.

Figure 23:
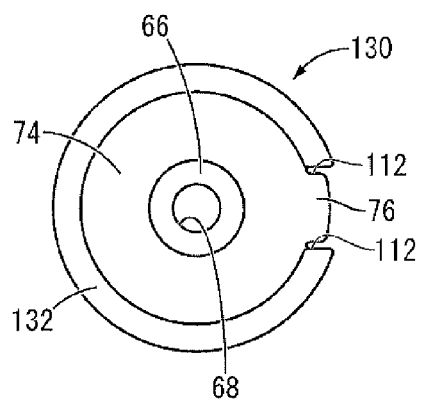
FIG. 23 is a plan view of an elastic rubber plate constituting an engine mount as still another embodiment of the present invention.

In addition, as shown in FIG. 23 of the elastic rubber plate 130, the spoke-shaped retaining portion 70 is not essential and can be omitted. Also, the central mounting portion 66 is formed in the elastic rubber plate 130, but the central mounting portion 66 is not essential, either, and only the contact retaining portion 132 can be formed along the outer peripheral end thereof.

Also, the contact retaining portion of the previously-described embodiment is formed of a thick rubber part, which is made thicker than the movable film portion 74 and the elastic valve portion 76, but the contact retaining portion can be formed, for example, in approximately the same thickness as the movable film portion 74 or the elastic valve portion 76, and a constricted portion can be formed by making the distance partially shorter between the opposing faces of the bottom wall in the containing recess of the partition member and the cover member so that the contact retaining portion is held clamped at the constricted portion.

Also, the communication hole 54 is not essential, and the end opening of the communication passage 82 on the side of the pressure-receiving chamber 58 can be defined by the through hole 52.

Also, the containing recess is not limited to an annular shape but can be in a circular shape, for example. Evident from this, the inner hole 68 formed on the elastic rubber plate at its center in the radial direction is not essential, either.

The fluid-filled vibration damping device relating to the present invention is not to be used only as an engine mount but can also be used as a sub-frame mount, a body mount, a differential mount and the like. In addition, the applicable range of the present invention is not limited to the fluid-filled vibration damping device for motor vehicles but is also applicable favorably to the fluid-filled vibration damping device for motorcycles, railroad cars, industrial vehicles and so forth.

What is claimed is:

1. A fluid-filled vibration damping device comprising:
   a first mounting member;
   a second mounting member;
   a main rubber elastic body connecting the first and second mounting members;
   a pressure-receiving chamber whose wall portion is partially defined by the main rubber elastic body;
   an equilibrium chamber whose wall portion is partially defined by a flexible film, the pressure-receiving chamber and the equilibrium chamber containing a non-compressible fluid sealed therein;
   an orifice passage through which the pressure-receiving chamber and the equilibrium chamber communicate with each other;
   a partition member that separates the pressure-receiving chamber from the equilibrium chamber while having a communication aperture through which the pressure-receiving chamber and the equilibrium chamber communicate; and
   an elastic rubber plate arranged so as to cover the communication aperture by being superposed thereon from a pressure-receiving chamber side so that pressure in the pressure-receiving chamber is applied to a first surface of the elastic rubber plate while pressure in the equilibrium chamber is applied to a second surface thereof via the communication aperture, wherein
   the elastic rubber plate includes one or more contact retaining portions that are provided on an outer peripheral edge thereof and retained in contact against the partition member, and a deformation-allowing region that is provided between circumferentially opposite ends of one or two of the contact retaining portions of the elastic rubber plate and that is elastically deformable based on pressure differential between the pressure-receiving chamber and the equilibrium chamber, a gap is formed between the deformation-allowing region and the partition member so that a communication passage is constituted by including the gap through which the pressure-receiving chamber and the equilibrium chamber communicate with each other, and in a static state of the device, the communication aperture is held in communication with the pressure-receiving chamber through the gap.

2. The fluid-filled vibration damping device according to claim 1, wherein the partition member includes a recess that opens up on a surface thereof on the pressure-receiving chamber side while being formed on an outer peripheral side of the communication aperture and held in communication with the communication aperture, and an inner edge of the recess on a side of the communication aperture is covered by the deformation-allowing region of the elastic rubber plate while an outer edge of the recess extends outward beyond an outer periphery of the elastic rubber plate so as to form the gap.

3. The fluid-filled vibration damping device according to claim 1, wherein the deformation-allowing region of the elastic rubber plate includes an isolated portion whose surface on an equilibrium chamber side is located closer to the pressure-receiving chamber side than a surface of the contact retaining portion on the equilibrium chamber side, and the contact retaining portion is abutted against a surface of the partition member on the pressure-receiving chamber side while the isolated portion of the deformation-allowing region is arranged to be separated from the surface of the partition member on the pressure-receiving chamber side so as to form the gap.

4. The fluid-filled vibration damping device according to claim 1, wherein a cutout is formed between a circumferential end of the deformation-allowing region and one of the circumferentially opposite ends of one or two of the contact retaining portions adjacent thereto so that the deformation-allowing region is separated from the contact retaining portion in a circumferential direction by the cutout.

5. The fluid-filled vibration damping device according to claim 1, wherein a low spring part is formed between a circumferential end of the deformation-allowing region and one of the circumferentially opposite ends of one or two of the contact retaining portions adjacent thereto and is elastically deformable more easily than the deformation-allowing region.

6. The fluid-filled vibration damping device according to claim 1, wherein the one or more contact retaining portions are formed of one or more thick rubber parts, a press retaining member is provided on an opposite side from the partition member across the thick rubber part so that the thick rubber part is pressed by the press retaining member against the partition member to be elastically held clamped, and the deformation-allowing region located between circumferentially opposite ends of one or two of the thick rubber parts is made thinner than the thick rubber part.

7. The fluid-filled vibration damping device according to claim 1, wherein the elastic rubber plate includes a central mounting portion integrally formed with a central portion thereof and the central mounting portion is mounted to the partition member in a fixed state, a spoke-shaped retaining portion is provided so as to extend peripherally outward from the central mounting portion, and the one contact retaining portion is provided at a tip of the spoke-shaped retaining portion so as to extend in a circumferential direction therefrom.

* * * * *